(12) United States Patent
Li et al.

(10) Patent No.: US 8,994,691 B2
(45) Date of Patent: Mar. 31, 2015

(54) IN-CELL CAPACITIVE TOUCH PANEL AND METHOD OF MANUFACTURING THE SAME

(75) Inventors: Wei Li, Beijing (CN); Dong Chen, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 149 days.

(21) Appl. No.: 13/805,207

(22) PCT Filed: Sep. 12, 2012

(86) PCT No.: PCT/CN2012/081301
§ 371 (c)(1),
(2), (4) Date: Dec. 18, 2012

(87) PCT Pub. No.: WO2013/037294
PCT Pub. Date: Mar. 21, 2013

(65) Prior Publication Data
US 2014/0176820 A1    Jun. 26, 2014

(30) Foreign Application Priority Data

Sep. 13, 2011 (CN) .......................... 2011 1 0267828

(51) Int. Cl.
*G06F 3/045* (2006.01)
*G02F 1/1333* (2006.01)
(Continued)

(52) U.S. Cl.
CPC ............ *G02F 1/13338* (2013.01); *G06F 3/044* (2013.01); *G06F 2203/04103* (2013.01);
(Continued)

(58) Field of Classification Search
CPC ....................................................... G09G 3/36
USPC ............ 345/173–178, 104; 178/18.05–18.06, 178/18.01; 349/12
See application file for complete search history.

(56) References Cited

U.S. PATENT DOCUMENTS 8,658,957 B2 * 2/2014 Brown et al. .............. 250/208.1
2003/0048261 A1 * 3/2003 Yamamoto et al. ........... 345/173
(Continued)

FOREIGN PATENT DOCUMENTS

CN    1916712 A    2/2007
CN    1942851 A    4/2007
(Continued)

OTHER PUBLICATIONS

International Search Report mailed Dec. 6, 2012; PCT/CN2012/081301.
(Continued)

*Primary Examiner* — Lun-Yi Lao
*Assistant Examiner* — Kelly B Hegarty
(74) *Attorney, Agent, or Firm* — Ladas & Parry LLP

(57) ABSTRACT

According to embodiments of the invention, an in-cell capacitive contact panel and a manufacturing method thereof are provided. The in-cell capacitive touch panel comprises an array substrate. The array substrate comprises a display pixel structure and a touch circuit, and the touch circuit comprises a sensing unit and an amplifying unit connected with each other. The sensing unit is connected to a gate line in the display pixel structure. A switch-on voltage is provided by the gate line in the display pixel structure to the sensing unit, a voltage is generated in the sensing unit after the sensing unit is switched on, the voltage generated in the sensing unit is changed by a touch operation, the amplifying unit amplifies the voltage change in the sensing unit and outputs the amplified voltage change.

17 Claims, 6 Drawing Sheets

(51) Int. Cl.
*G06F 3/044* (2006.01)
*G02F 1/1368* (2006.01)
*G02F 1/1339* (2006.01)

(52) U.S. Cl.
CPC .......... *G02F1/1368* (2013.01); *G02F 1/13394* (2013.01); *G02F 2001/13398* (2013.01); *G02F 2202/16* (2013.01)
USPC ........ 345/174; 345/173; 345/104; 178/18.01; 178/18.06; 349/12

(56) References Cited

U.S. PATENT DOCUMENTS

| | | | |
|---|---|---|---|
| 2007/0222762 A1* | 9/2007 | Van Delden et al. | 345/173 |
| 2008/0309627 A1* | 12/2008 | Hotelling et al. | 345/173 |
| 2009/0058831 A1* | 3/2009 | Chen et al. | 345/174 |
| 2009/0206848 A1* | 8/2009 | Chuang et al. | 324/686 |
| 2009/0237369 A1* | 9/2009 | Hur et al. | 345/173 |
| 2009/0256815 A1* | 10/2009 | Westerinen et al. | 345/174 |
| 2010/0060600 A1* | 3/2010 | Wang et al. | 345/173 |
| 2010/0155731 A1* | 6/2010 | Sun et al. | 257/59 |
| 2011/0074727 A1* | 3/2011 | Kim | 345/174 |
| 2011/0199329 A1* | 8/2011 | Kitakado et al. | 345/174 |
| 2012/0013572 A1* | 1/2012 | Pak et al. | 345/174 |
| 2012/0050220 A1* | 3/2012 | Liu | 345/174 |
| 2012/0206408 A1* | 8/2012 | Brown | 345/174 |
| 2012/0249458 A1* | 10/2012 | Okazaki et al. | 345/173 |
| 2012/0287075 A1* | 11/2012 | Tai et al. | 345/174 |
| 2012/0293459 A1* | 11/2012 | Wu et al. | 345/174 |

FOREIGN PATENT DOCUMENTS

| | | |
|---|---|---|
| CN | 101661201 A | 3/2010 |
| CN | 101957510 A | 1/2011 |
| TW | 201113788 A | 4/2011 |

OTHER PUBLICATIONS

International Preliminary Report on Patentability dated Mar. 18, 2014; PCT/CN2012/01301.
First Chinese Office Action dated Mar. 26, 2014; Appl. No. 201110267828.X.

* cited by examiner

IN-CELL CAPACITIVE TOUCH PANEL AND METHOD OF MANUFACTURING THE SAME

TECHNICAL FIELD

Embodiments of the invention relate to an in-cell capacitive touch panel and a method of manufacturing the same.

BACKGROUND

At present, touch panel technology has been widely applied to liquid crystal display, so as to produce a display with touch function in which image display and touch operation can be performed at the same time. A touch panel may be of resistive type, capacitive type, wave (e.g. acoustic wave, infrared ray and laser) type, etc. The capacitive type touch panel is classified into: on-cell capacitive touch panel and in-cell capacitive touch panel. The on-cell capacitive touch panel is directly laminated on a display panel, and the in-cell capacitive touch panel is incorporated into a display panel.

In a liquid crystal display with on-cell capacitive touch panel, since the touch panel needs to be laminated on the display panel, thickness and weight of the display are increased greatly, which does not conform with the requirements for light, thin and small liquid crystal display in current markets. In addition, since the touch panel needs to be laminated on the display panel, light from a light source has to pass through a number of structural layers, thus quite amount of light is absorbed and light transmittance is decreased.

In a conventional liquid crystal display with in-cell capacitive touch panel, a touch circuit is designed on an array substrate. This design will cause some structural layers to be interposed between a touch sensing electrode of the in-cell capacitive touch panel and a screen of the liquid crystal display, so that distance between the touch sensing electrode and the screen is increased. Accordingly, capacitance change generated by a touch operation is affected, and touch sensing property is degraded. In addition, since a touch circuit is built in the liquid crystal display, manufacturing procedure of the liquid crystal display is complicated, and accordingly manufacture cost is relatively high.

SUMMARY

According to an aspect of the invention, there is provided an in-cell capacitive touch panel. The in-cell capacitive touch panel comprises an array substrate. The array substrate comprises a display pixel structure and a touch circuit, and the touch circuit comprises a sensing unit and an amplifying unit connected with each other. The sensing unit is connected to a gate line in the display pixel structure. A switch-on voltage is provided by the gate line in the display pixel structure to the sensing unit, a voltage is generated in the sensing unit after the sensing unit is switched on, the voltage generated in the sensing unit is changed by a touch operation, the amplifying unit amplifies the voltage change in the sensing unit and outputs the amplified voltage change.

According to another aspect of the invention, there is provided a manufacturing method of an in-cell capacitive touch panel. The method comprises forming an array substrate which comprises a display pixel structure and a touch circuit. The touch circuit comprises a sensing unit and an amplifying unit connected to each other, and the sensing unit is connected to a gate line in the display pixel structure. The array substrate is formed that, a switch-on voltage is provided by the gate line in the display pixel structure to the sensing unit, a voltage is generated in the sensing unit after the sensing unit is switched on, the voltage generated in the sensing unit is changed by a touch operation, the amplifying unit amplifies the voltage change in the sensing unit and outputs the amplified voltage change.

According to the embodiments of the invention, a touch function of the liquid crystal display is achieved by providing the touch circuit on the array substrate of the liquid crystal display. By designing masks for manufacturing the array substrate and designing masks for manufacturing the counter substrate, the in-cell capacitive touch panel can be manufactured without increasing the manufacturing processes of a normal liquid crystal display, so that manufacture cost of the in-cell capacitive touch liquid crystal display can be lowered. In addition, according to the embodiments of the invention, the conductive shield element is provided on the sensing capacitor, so that impact of the liquid crystal capacitor in the liquid crystal display on the sensing capacitor is shielded and distance between the sensing capacitor and the display screen becomes small. Thus, the sensing capacitor is more sensitive to the touch operation, and the touch sensing property can be enhanced.

BRIEF DESCRIPTION OF THE DRAWINGS

To illustrate technical solutions in embodiments of the present invention more clearly, accompanied drawings of the embodiments will be briefly introduced below. Obviously, the accompanied drawings described below merely relate to some embodiments of the present invention, but are not limitative of the present invention.

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

Embodiment 1

Figure 1:
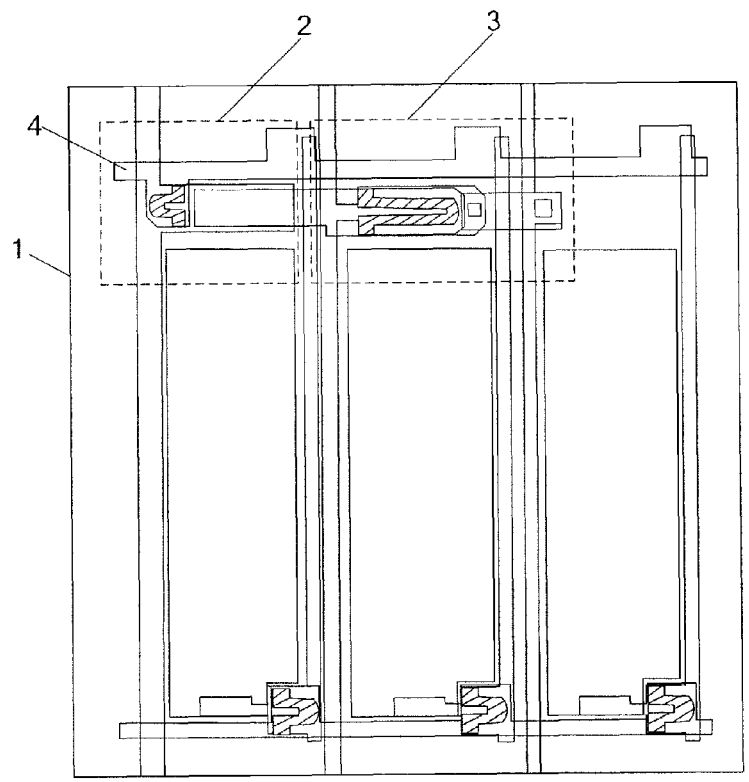
FIG. 1 is a structurally schematic view showing an in-cell capacitive touch panel according to a first embodiment of the invention.

An in-cell capacitive touch panel is provided by a first embodiment of the invention, and the in-cell capacitive touch panel comprises an array substrate 1. As shown in FIG. 1, the array substrate 1 comprises a display pixel structure and a touch circuit. The touch circuit comprises a sensing unit 2 and an amplifying unit 3. The sensing unit 2 is connected to the amplifying unit 3, and the sensing unit 2 is also connected to a gate line 4 in the display pixel structure of the array substrate 1. A switch-on voltage is provided by the gate line 4 in the display pixel structure to the sensing unit 2, and after the sensing unit 2 is switched on, a voltage is generated in the sensing unit 2. The voltage generated in the sensing unit 2 is changed by a touch operation. The amplifying unit 3 amplifies the voltage change in the sensing unit 2 and outputs the amplified voltage change, so that the voltage change can be detected by a chip for detecting touch signal more sensitively and the position of the touch operation can be determined.

Figure 2:
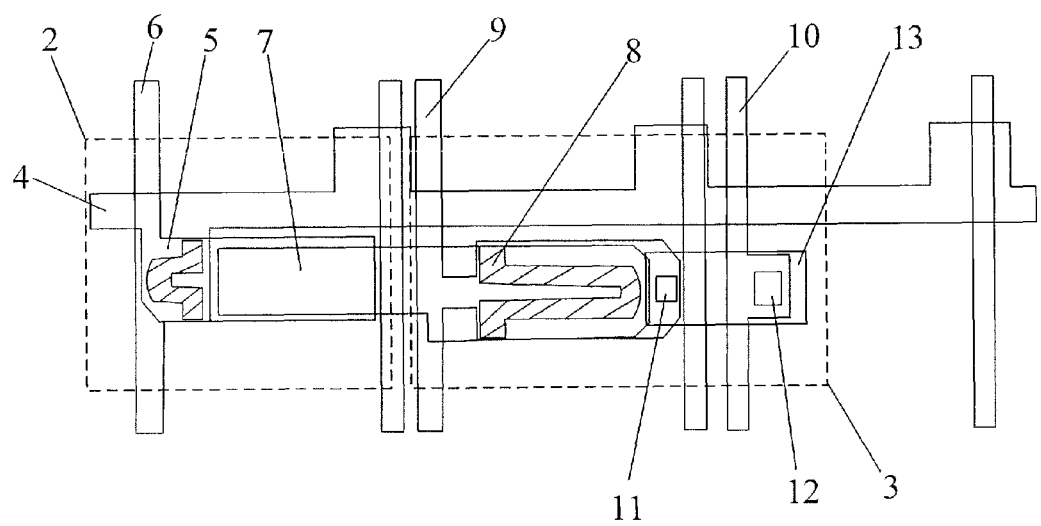
FIG. 2 is a structurally schematic view showing a sensing unit and an amplifying unit according to the first embodiment of the invention.

As shown in FIG. 2, the sensing unit 2 in this embodiment comprises: a first thin film field effect transistor 5, a sensing capacitor 7 and a preset voltage line 6. The first thin film field effect transistor 5 may be provided in a same layer as a thin film field effect transistor in the display pixel structure. The sensing capacitor 7 and the preset voltage line 6 may be provided in a same layer as a data line in the display pixel structure.

As shown in FIG. 2, the amplifying unit 3 in this embodiment comprises: a second thin film field effect transistor 8, a power supply line 10 and a touch data line 9. The second thin film field effect transistor 8 may be provided in a same layer as the thin film field effect transistor in the display pixel structure. The power supply line 10 and the touch data line 9 may be provided in a same layer as the data line in the display pixel structure.

A gate electrode of the first thin film field effect transistor 5 is connected to the gate line 4 in the display pixel structure, a source electrode of the first thin film field effect transistor 5 is connected to the preset voltage line 6, and a drain electrode of the first thin film field effect transistor 5 is connected to the sensing capacitor 7. Preferably, a pattern of the drain electrode of the first thin film field effect transistor 5 is simultaneously functions as an upper plate of the sensing capacitor 7. A gate electrode of the second thin film field effect transistor 8 is connected to a lower plate of the sensing capacitor 7, a drain electrode of the second thin film field effect transistor 8 is connected to the touch data line 9, and a source electrode of the second thin film field effect transistor 8 and the power supply line 10 are connected to a transparent conductive film 13 through a via hole 11 for the source electrode of the second thin film field effect transistor 8 and a via hole 12 for the power supply line 10, respectively. That is, the source electrode of the second thin film field effect transistor 8 and the power supply line 10 are connected to each other.

A switch-on voltage is provided by the gate line 4 in the display pixel structure to the first thin film field effect transistor 5, and a charging voltage is provided by the preset voltage line 6 to the first thin film field effect transistor 5. After the first thin film field effect transistor 5 is switched on, the sensing capacitor 7 is charged, so that a voltage is generated in the sensing capacitor 7. The voltage in the sensing capacitor 7 is changed by a touch operation. Power is provided by the power supply line 10 to the second thin film field effect transistor 8. Voltage change in the sensing capacitor 7 is amplified by the second thin film field effect transistor 8, and the amplified voltage change is output by the touch data line 9.

Figure 3:
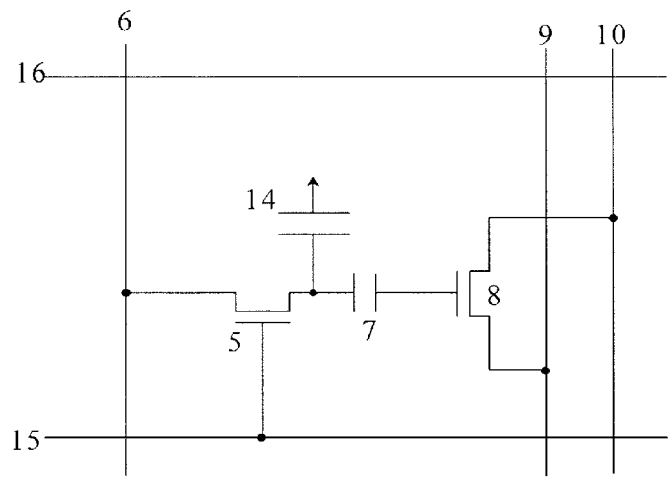
FIG. 3 is a schematic view showing an operation principle of the in-cell capacitive touch panel according to the first embodiment of the invention.

The operation principle of the touch circuit is shown in FIG. 3. The source electrode of the first thin film field effect transistor 5 is connected to the preset voltage line 6, and the gate electrode of the first thin film field effect transistor 5 is connected to the gate line 15 of (n+1)-th row in the display pixel structure. Two terminals of the sensing capacitor 7 are respectively connected to the drain electrode of the first thin film field effect transistor 5 and the gate electrode of the second thin film field effect transistor 8. The source electrode of the second thin film field effect transistor 8 is connected to the power supply line 10, and the drain electrode of the second thin film field effect transistor 8 is connected to the sensing data line 9.

In the embodiment of the invention, for example, a turn-on voltage of the second thin film field effect transistor 8 may be 12V, and a preset voltage applied on the preset voltage line 6 may be equal to the turn-on voltage of the second thin film field effect transistor 8 and may be 12V as well. When the gate line 15 of (n+1)-th row in the display pixel structure is scanned, namely, a gate voltage is input to the gate line 15 of (n+1)-th row in the display pixel structure, the source electrode and the drain electrode of the first thin film field effect transistor 5 are electrically connected with each other. At this time, the sensing capacitor 7 is charged by the preset voltage line 6 through the first thin film field effect transistor 5, so that voltage in the sensing capacitor 7 reaches 12V and the voltage of the gate electrode of the second thin film field effect transistor 8 which is connected to the sensing capacitor 7 also becomes 12V. Then, the source electrode and the drain electrode of the second thin film field effect transistor 8 are electrically connected with each other because the turn-on voltage of the second thin film field effect transistor 8 is 12V. In this case, if a voltage applied on the power supply line 10 for example is 4V, a voltage on the touch data line 9 is also 4V.

When the gate line of (n+2)-th row in the display pixel structure is scanned, no voltage signal is input to the gate line 15 of (n+1)-th row. At this time, the source electrode and the drain electrode of the first thin film field effect transistor 5 are not electrically connected with each other, and the voltage in the sensing capacitor 7 maintains at 12V. Because human body carries an electric field itself, a coupling capacitor 14 is formed between a finger and the sensing capacitor when the finger touches a region on a display screen corresponding to the sensing capacitor, and a part of electricity quantity of the sensing capacitor 7 is lost. Thereby, the voltage in the sensing capacitor 7 is lowered, namely, the voltage in the sensing capacitor 7 becomes smaller than 12V, and the voltage of the gate electrode of the second thin film field effect transistor 8 which is connected to the sensing capacitor 7 also becomes smaller than 12V. The source electrode and the drain electrode of the second thin film field effect transistor 8 are not electrically connected with each other at this time because the turn-on voltage of the second thin film field effect transistor 8 is 12V. Then, the voltage of the touch data line 9 becomes 0V.

Voltage change in the sensing capacitor 7 which is caused by the electric field of human body is very small, thus it is difficult for the chip for detecting touch signal to detect this voltage change. According to the embodiment of the invention, the amplifying circuit is added into the touch circuit. When no touch operation is performed in the region on the display screen corresponding to the sensing capacitor 7, there is no voltage change in the sensing capacitor 7, at this time, the source electrode and the drain electrode of the second thin film field effect transistor 8 are electrically connected with each other, and the voltage of the touch data line 9 for example is 4V. When a touch operation is performed in the region on the display screen corresponding to the sensing capacitor 7, the voltage in the sensing capacitor 7 is lowered as described above, at this time, the source electrode and the drain electrode of the second thin film field effect transistor 8 are not electrically connected with each other, and the voltage of the touch data line 9 becomes 0V. The touch data line 9 is connected to the chip for detecting touch signal. In this way, a tiny voltage change in the sensing capacitor 7 is amplified to be a change from 4V to 0V, so that this change can be detected by the chip for detecting touch signal sensitively. Thereby, position of the touch operation can be easily determined.

Figure 4:
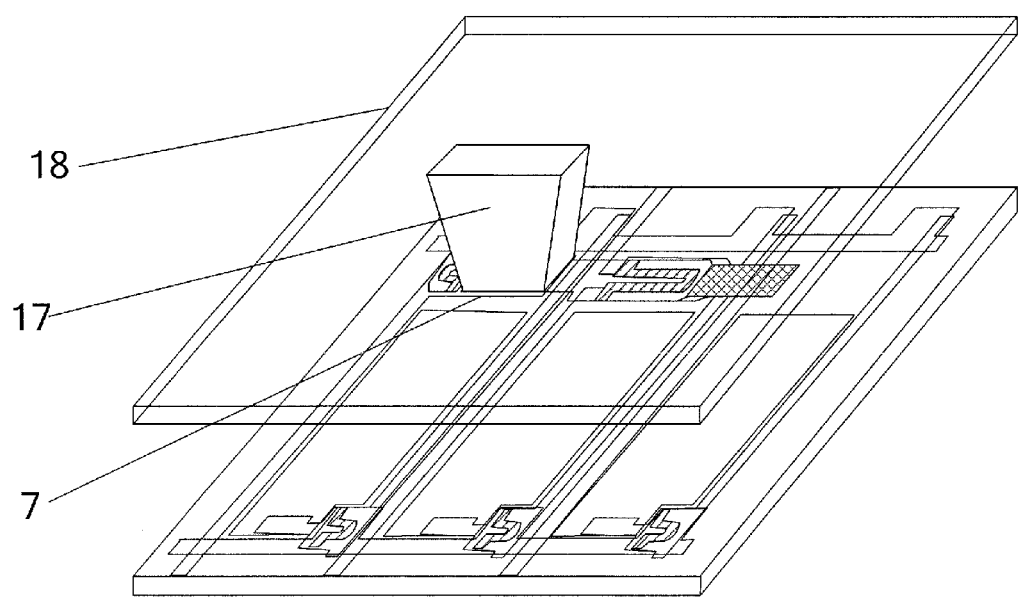
FIG. 4 is a schematic view showing a provision manner of a conductive shield element according to the first embodiment of the invention.

As shown in FIG. 4, a conductive shield element 17 is provided on the sensing capacitor 7 according to the embodiment of the invention. An upper surface of the conductive shield element 17 contacts a counter substrate 18. Size of a lower surface of the conductive shield element 17 is larger than or equal to the size of the upper plate of the sensing capacitor 7 (i.e. the size of the pattern of the drain electrode of the first thin film field effect transistor 5), so as to completely cover the upper plate of the sensing capacitor 7 by the lower surface of the conductive shield element 17. The conductive shield element 17 may be formed by conductive polystyrene. The conductive shield element 17 is used to connect the upper plate of the sensing capacitor 7 to the counter substrate 18 and to shield influence of a liquid crystal capacitor on the touch circuit. For example, the counter substrate 18 may be a color filter substrate. In a conventional technology, a liquid crystal layer is interposed between the sensing capacitor and the counter substrate, the distance from the sensing capacitor to the display screen is relatively large, thus capacitance change caused by touch operation is affected and touch sensing property is degraded. Moreover, in the conventional technology, the liquid crystal capacitor in the liquid crystal display device has an adverse influence on the sensing capacitor. However, according to the embodiment of the invention, the conductive shield element provided on the sensing capacitor connects the sensing capacitor to the counter substrate, so that the distance between the sensing capacitor and the display screen becomes small. Thus, the sensing capacitor is more sensitive to the touch operation, and the touch sensing property can be enhanced.

According to the in-cell capacitive touch panel provided by the embodiment of the invention, a touch function of the liquid crystal display can be achieved by providing the touch circuit on the array substrate of the liquid crystal display, the capacitive touch panel can be realized without increasing manufacturing processes of the normal liquid crystal display, and the manufacture cost of the in-cell capacitive touch panel can be reduced. According to the in-cell capacitive touch panel provided by the embodiment of the invention, addition of the amplifying circuit into the touch circuit allows the chip for detecting touch signal to detect voltage change at the touch position more sensitively and determine the position of the touch operation more easily. According to the in-cell capacitive touch panel provided by the embodiment of the invention, the conductive shield element is provided on the sensing capacitor, so that impact of the liquid crystal capacitor in the liquid crystal display on the sensing capacitor is shielded and the distance between the sensing capacitor and the display screen becomes small. Thus, the sensing capacitor is more sensitive to the touch operation, and the touch sensing property can be enhanced.

Embodiment 2

A manufacturing method of an in-cell capacitive touch panel is provided by a second embodiment of the invention. For example, the manufacturing method comprises the following steps.

101, an array substrate which comprises a display pixel structure and a touch circuit is formed. The touch circuit comprises a sensing unit and an amplifying unit connected with each other. The sensing unit is connected to a gate line in the display pixel structure. A switch-on voltage is provided by the gate line in the display pixel structure to the sensing unit, and after the sensing unit is switched on, a voltage is generated in the sensing unit. The voltage generated in the sensing unit is changed by a touch operation. The amplifying unit amplifies the voltage change in the sensing unit and outputs the amplified voltage change.

102, a counter substrate is formed. For example, the counter substrate may be a color filter substrate.

103, the counter substrate and the array substrate are bonded with each other and a liquid crystal layer is sandwiched between the counter substrate and the array substrate.

In the following, the manufacturing method according to the embodiment of the invention will be described in detail with reference to FIG. 5-FIG. 11.

The sensing unit comprises: a first thin film field effect transistor, a sensing capacitor and a preset voltage line.

The amplifying unit comprises: a second thin film field effect transistor, a touch data line and a power supply line.

The display pixel structure comprises: a thin film field effect transistor, a gate line, a data line and a pixel electrode.

In the step 101 of forming the array substrate which comprises the display pixel structure and the touch circuit, the following steps may be comprised.

1011, a gate line pattern and a gate insulating layer are formed on a substrate. The gate line pattern comprises a gate line pattern for the display pixel structure, a gate line pattern for the first thin film field effect transistor and a gate line pattern for the second thin film field effect transistor.

Figure 5:
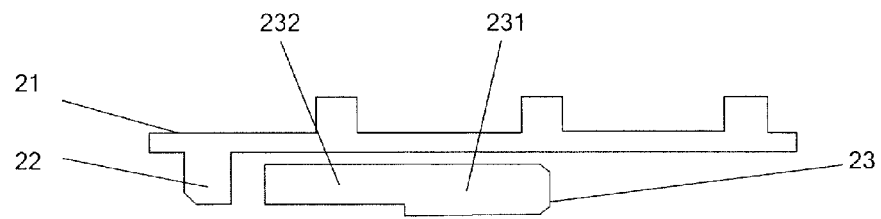
FIG. 5 is a structurally schematic view showing a gate line according to a second embodiment of the invention.
Figure 5:
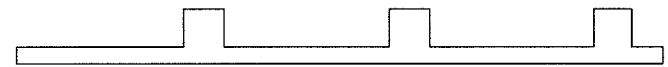

As shown in FIG. 5, the gate line pattern 22 for the first thin film field effect transistor is connected to the gate line pattern 21 for the display pixel structure, and the gate line pattern 23 for the second thin film field effect transistor comprises a first gate line pattern 231 and a second gate line pattern 232 connected to each other. The first gate line pattern 231 is used for forming the second thin film field effect transistor, and the second gate line pattern 232 is used for forming the sensing capacitor and the second gate line pattern 232 is used as a lower plate of the sensing capacitor.

1012, an active region of the thin film field effect transistor and the pixel electrode are formed on the substrate formed with the gate line pattern and the gate insulating layer. In addition, an active region of the first thin film field effect transistor and an active region of the second thin film field effect transistor also may be formed in this step.

Figure 6:
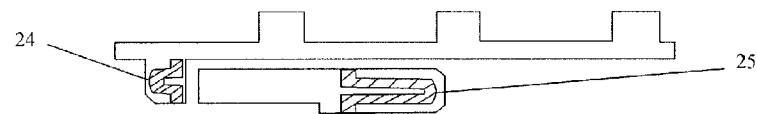
FIG. 6 is a structurally schematic view showing an active region of a thin film field effect transistor according to the second embodiment of the invention.
Figure 6:
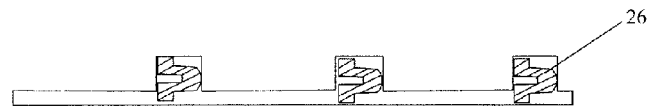

As shown in FIG. 6, the active region 26 of the thin film field effect transistor is disposed to correspond to the gate line pattern for the thin film field effect transistor, the active region 24 of the first thin film field effect transistor is disposed to correspond to the gate line pattern for the first thin film field effect transistor, and the active region 25 of the second thin film field effect transistor is disposed to correspond to the first gate line pattern 231 of the gate line pattern for the second thin film field effect transistor.

Figure 7:
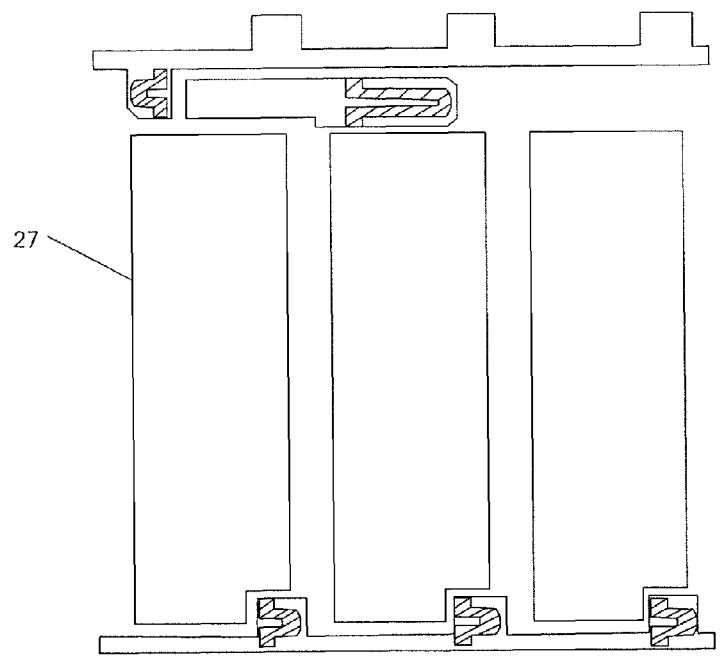
FIG. 7 is a structurally schematic view showing a pixel electrode according to the second embodiment of the invention.

As shown in FIG. 7, a pixel-electrode material layer is deposited on the gate insulating layer, and the pixel electrode 27 is formed by a patterning process.

1013, the data line and a drain electrode of the thin film field effect transistor are formed on the substrate formed with the active region of the thin film field effect transistor and the pixel electrode. In addition, the preset voltage line, a drain electrode of the first thin film field effect transistor, the touch data line and the power supply line also may be formed in this step.

Figure 8:
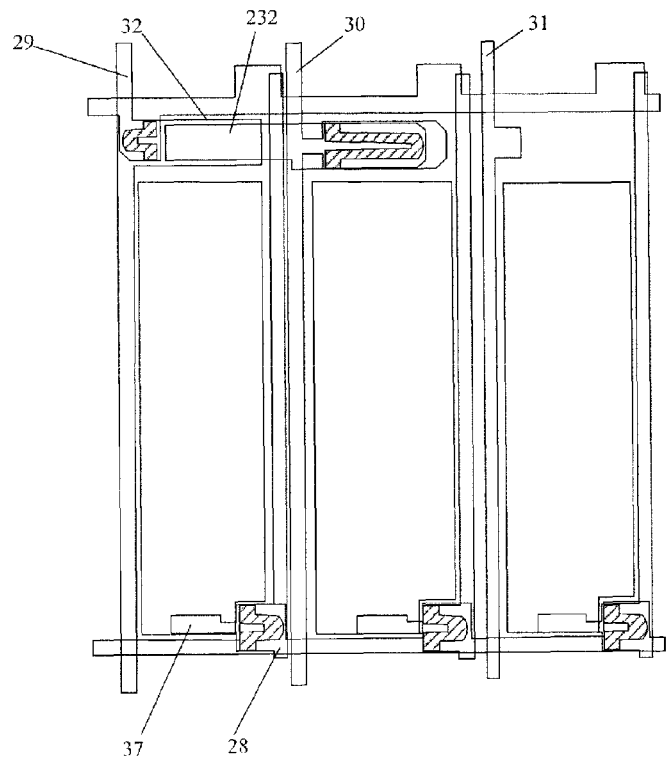
FIG. 8 is a structurally schematic view showing a data line according to the second embodiment of the invention.

As shown in FIG. 8, a data line layer is deposited on the substrate on which the active region of the thin film field effect transistor and the pixel electrode have been formed, and the data line 28, the drain electrode 37 of the thin film field effect transistor, the preset voltage line 29, the drain electrode 32 of the first thin film field effect transistor, the touch data line 30 and the power supply line 31 are formed by a patterning process. The drain electrode 32 of the first thin film field effect transistor is provided to correspond to the second gate line pattern 232, and the gate insulating layer is interposed between the drain electrode 32 of the first thin film field effect transistor and the second gate line pattern 232, so that the sensing capacitor is formed by the drain electrode of the first thin film field effect transistor and the second gate line pattern.

1014, a passivation layer and a via hole for the drain electrode of the thin film field effect transistor are formed on the substrate formed with the data line and the drain electrode of the thin film field effect transistor. In addition, a via hole for a source electrode of the second thin film field effect transistor and a via hole for the power supply line also may be formed in this step.

Figure 9:
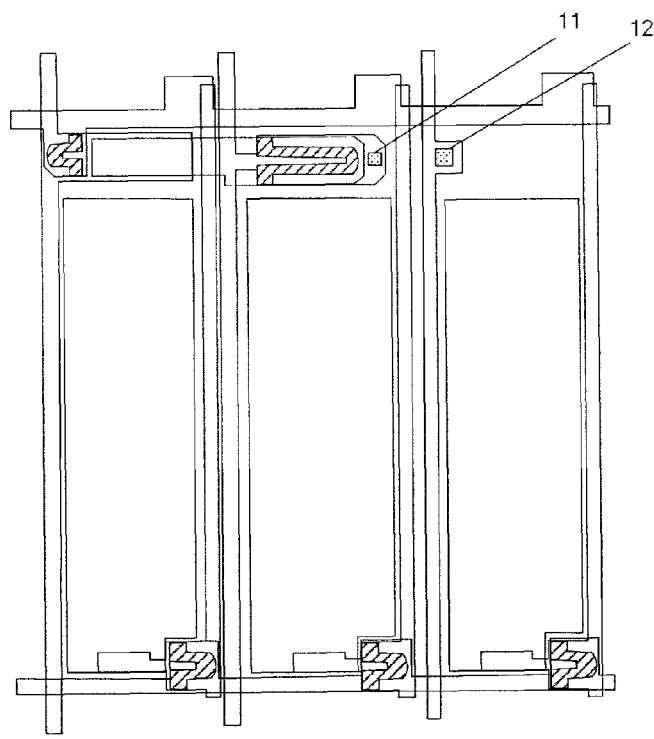
FIG. 9 is a structurally schematic view showing a passivation layer according to the second embodiment of the invention.

As shown in FIG. 9, the passivation layer is deposited on the substrate on which the data line and the drain electrode of the thin film field effect transistor have been formed, and the via hole for the drain electrode of the thin film field effect transistor, the via hole 11 for the source electrode of the second thin film field effect transistor and the via hole 12 for the power supply line are formed by a patterning process.

1015, a transparent conductive film for the second thin film field effect transistor is formed on the substrate formed with the passivation layer and the via hole for the drain electrode of the thin film field effect transistor. In addition, a common electrode also may be formed in this step.

Figure 10:
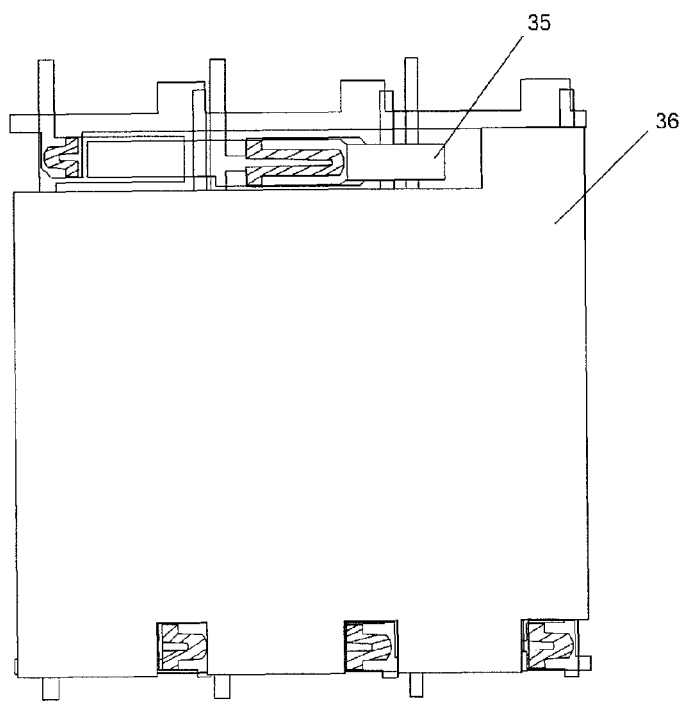
FIG. 10 is a structurally schematic view showing a transparent conductive film according to the second embodiment of the invention.

As shown in FIG. 10, a layer for the transparent conductive film is deposited on the passivation layer, and the common electrode 36 and the transparent conductive film 35 for the second thin film field effect transistor are formed by a patterning process. The transparent conductive film 35 for the second thin film field effect transistor covers the via hole 11 for the source-electrode of the second thin film field effect transistor and the via hole 12 for the power supply line, so that the source electrode of the second thin film field effect transistor and the power supply line are connected to the transparent conductive film 35 for the second thin film field effect transistor through the via hole 11 for the source electrode of the second thin film field effect transistor and the via hole 12 for the power supply line, respectively. That is, the source electrode of the second thin film field effect transistor and the power supply line are connected with each other through the via hole 11, the transparent conductive film 35 and the via hole 12.

The step 102 of forming the counter substrate may be performed as follows.

According to the embodiment of the invention, a conductive shield element material is attached to an inner surface (namely, a surface opposed to the array substrate) of the counter substrate so as to form a conductive shield element. The conductive shield element is provided to correspond to the drain electrode of the first thin film field effect transistor (i.e. the upper plate of the sensing capacitor) of the touch circuit. Size of a lower surface of the conductive shield element is larger than or equal to the size of the pattern of the drain electrode of the first thin film field effect transistor, so that the drain electrode of the first thin film field effect transistor of the touch circuit can be completely covered by the conductive shield element after the counter substrate and the array substrate are bonded with each other. The conductive shield element may be formed by conductive polystyrene.

Figure 11:
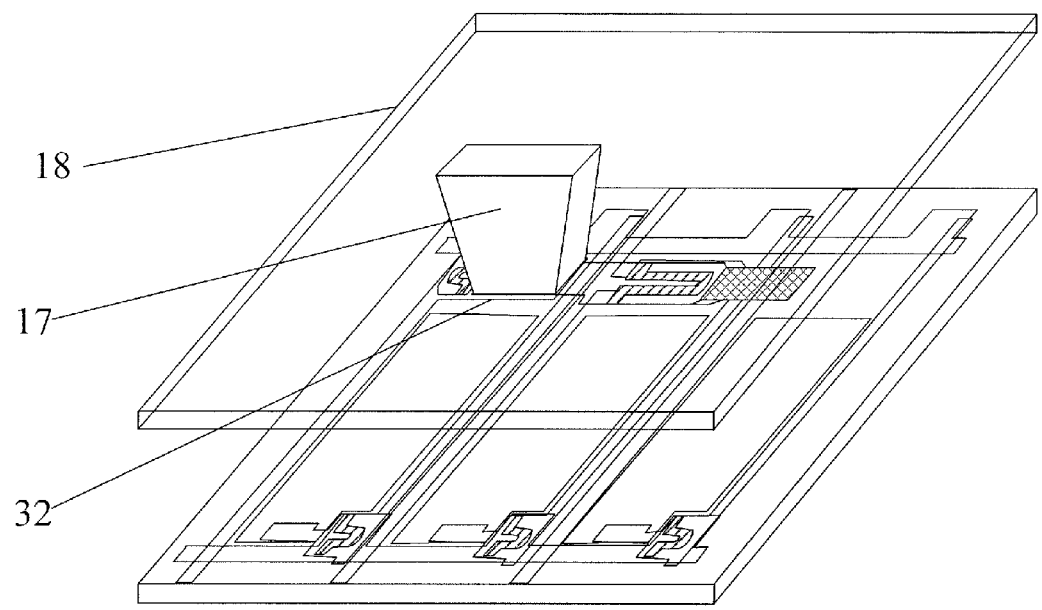
FIG. 11 is a structurally schematic view showing a conductive shield element according to the second embodiment of the invention.

In the step 103, the counter substrate and the array substrate are bonded with each other, and liquid crystal molecules are injected into the space formed between the counter substrate and the array substrate so as to form the liquid crystal layer. As shown in FIG. 11, after the counter substrate and the array substrate are bonded with each other, an upper surface of the conductive shield element 17 contacts the counter substrate 18, and the lower surface of the conductive shield element 17 completely covers the drain electrode 32 of the first thin film field effect transistor (i.e. the upper plate of the sensing capacitor). The conductive shield element 17 is used to connect the upper plate of the sensing capacitor to the counter substrate and to shield influence of a liquid crystal capacitor on the touch circuit. In a conventional technology, a liquid crystal layer is interposed between the sensing capacitor and the counter substrate, the distance from the sensing capacitor to the display screen is relatively large, thus capacitance change caused by touch operation is affected and touch sensing property is degraded. Moreover, in the conventional technology, the liquid crystal capacitor in the liquid crystal display device has an adverse influence on the sensing capacitor. However, according to the embodiment of the invention, the conductive shield element provided on the sensing capacitor shields influence of the liquid crystal capacitor on the touch circuit and connects the sensing capacitor to the counter substrate, so that the distance between the sensing capacitor and the display screen becomes small. Thus, the sensing capacitor is more sensitive to the touch operation, and the touch sensing property can be enhanced.

According to the manufacturing method of the in-cell capacitive touch panel provided by the embodiment of the invention, a touch function of the liquid crystal display is achieved by providing the touch circuit on the array substrate of the liquid crystal display. By designing masks for manufacturing the array substrate and designing masks for manufacturing the counter substrate, the in-cell capacitive touch panel can be manufactured without increasing the manufacturing processes of a normal liquid crystal display, so that manufacture cost of the in-cell capacitive touch liquid crystal display can be lowered. In addition, according to the manufacturing method of the in-cell capacitive touch panel provided by the embodiment of the invention, the conductive shield element is provided on the sensing capacitor, so that impact of the liquid crystal capacitor in the liquid crystal display on the sensing capacitor is shielded and distance between the sensing capacitor and the display screen becomes small. Thus, the sensing capacitor is more sensitive to the touch operation, and the touch sensing property can be enhanced.

The descriptions made above are merely specific embodiments of the invention, but protection scope of the present invention is not limited thereto. All the changes or replacements, as would be easily conceived by those skilled in the technical field without departing from the technical scope that is disclosed by the present invention, shall come within the protection scope of the invention. Therefore, the protection scope of the present invention shall be defined by the protection scope of claims.

What is claimed is:

1. An in-cell capacitive touch panel, comprising an array substrate,
   wherein the array substrate comprises a display pixel structure and a touch circuit, and the touch circuit comprises a sensing unit and an amplifying unit;
   the sensing unit is connected to the amplifying unit, and the sensing unit is also connected to a gate line in the display pixel structure;
   a switch-on voltage is provided by the gate line in the display pixel structure to the sensing unit, a voltage is generated in the sensing unit after the sensing unit is switched on, the voltage generated in the sensing unit is changed by a touch operation, the amplifying unit amplifies the voltage change in the sensing unit and outputs the amplified voltage change;
   the sensing unit comprises a first thin film field effect transistor, a sensing capacitor and a preset voltage line;
   the amplifying unit comprises a second thin film field effect transistor, a power supply line and a touch data line; and
   a gate electrode of the second thin film field effect transistor is only directly connected to the sensing capacitor.

2. The in-cell capacitive touch panel according to claim 1, wherein
   a gate electrode of the first thin film field effect transistor is connected to the gate line in the display pixel structure, a source electrode of the first thin film field effect transistor is connected to the preset voltage line, and a drain electrode of the first thin film field effect transistor is connected to an upper plate of the sensing capacitor;
   the switch-on voltage is provided by the gate line in the display pixel structure to the first thin film field effect transistor, a charging voltage is provided by the preset voltage line to the first thin film field effect transistor, the sensing capacitor is charged by the first thin film field effect transistor after the first thin film field effect transistor is switched on, so that the voltage is generated in the sensing capacitor, and the voltage generated in the sensing capacitor is changed by the touch operation.

3. The in-cell capacitive touch panel according to claim 2, wherein the first thin film field effect transistor is provided in a same layer as a thin film field effect transistor in the display pixel structure, and the sensing capacitor and the preset voltage line are provided in a same layer as a data line in the display pixel structure.

4. The in-cell capacitive touch panel according to claim 2, wherein a pattern of the drain electrode of the first thin film field effect transistor also functions as the upper plate of the sensing capacitor.

5. The in-cell capacitive touch panel according to claim 2, wherein
   the gate electrode of the second thin film field effect transistor is connected to a lower plate of the sensing capacitor, a source electrode of the second thin film field effect transistor is connected to the power supply line, and a drain electrode of the second thin film field effect transistor is connected to the touch data line;
   power is provided by the power supply line to the second thin film field effect transistor, the voltage change in the sensing capacitor is amplified by the second thin film field effect transistor, and the amplified voltage change is output by the touch data line.

6. The in-cell capacitive touch panel according to claim 5, wherein the second thin film field effect transistor is provided in a same layer as a thin film field effect transistor in the display pixel structure, and the power supply line and the touch data line are provided in a same layer as a data line in the display pixel structure.

7. The in-cell capacitive touch panel according to claim 2, wherein the in-cell capacitive touch panel further comprises:
   a counter substrate, disposed opposite to the array substrate;
   a liquid crystal layer, filled between the array substrate and the counter substrate; and
   a conductive shield element, one end thereof disposed on the upper plate of the sensing capacitor in the sensing unit, and the other end thereof contacting the counter substrate.

8. The in-cell capacitive touch panel according to claim 7, wherein a size of the end of the conductive shield element disposed on the upper plate of the sensing capacitor is larger than or equal to a size of the upper plate of the sensing capacitor.

9. The in-cell capacitive touch panel according to claim 7, wherein the conductive shield element is formed by conductive polystyrene.

10. A manufacturing method of an in-cell capacitive touch panel, comprising:
    forming an array substrate which comprises a display pixel structure and a touch circuit, the touch circuit comprising a sensing unit and an amplifying unit connected to each other, the sensing unit being connected to a gate line in the display pixel structure,
    wherein the array substrate is formed that, a switch-on voltage is provided by the gate line in the display pixel structure to the sensing unit, a voltage is generated in the sensing unit after the sensing unit is switched on, the voltage generated in the sensing unit is changed by a touch operation, the amplifying unit amplifies the voltage change in the sensing unit and outputs the amplified voltage change;
    the sensing unit comprises a first thin film field effect transistor, a sensing capacitor and a preset voltage line;
    the amplifying unit comprises a second thin film field effect transistor, a power supply line and a touch data line; and
    a gate electrode of the second thin film field effect transistor is only directly connected to the sensing capacitor.

11. The manufacturing method according to claim 10, wherein the display pixel structure comprises a thin film field effect transistor, a gate line, a data line and a pixel electrode; and
    wherein the step of forming the array substrate which comprises the display pixel structure and the touch circuit comprises:
    forming a gate line pattern and a gate insulating layer on a substrate, the gate line pattern comprising a gate line pattern for the thin film field effect transistor, a gate line pattern for the first thin film field effect transistor and a gate line pattern for the second thin film field effect transistor;
    forming an active region of the thin film field effect transistor and the pixel electrode on the substrate formed with the gate line pattern and the gate insulating layer, and meanwhile forming an active region of the first thin film field effect transistor and an active region of the second thin film field effect transistor;

forming the data line and a drain electrode of the thin film field effect transistor on the substrate formed with the active region of the thin film field effect transistor and the pixel electrode, and meanwhile forming the preset voltage line, a drain electrode of the first thin film field effect transistor, the touch data line and the power supply line;

forming a passivation layer and a via hole for the drain electrode of the thin film field effect transistor on the substrate formed with the data line and the drain electrode of the thin film field effect transistor, and meanwhile forming a via hole for a source electrode of the second thin film field effect transistor and a via hole for the power supply line;

forming a transparent conductive film for the second thin film field effect transistor on the substrate formed with the passivation layer and the via hole for the drain electrode of the thin film field effect transistor.

12. The manufacturing method according to claim 11, wherein the gate line pattern for the second thin film field effect transistor comprises a first gate line pattern and a second gate line pattern connected with each other, the first gate line pattern is used for forming the second thin film field effect transistor, and the second gate line pattern is used for forming the sensing capacitor.

13. The manufacturing method according to claim 12, wherein the drain electrode of the first thin film field effect transistor is disposed to correspond to the second gate line pattern, so that the sensing capacitor is formed by the drain electrode of the first thin film field effect transistor and the second gate line pattern.

14. The manufacturing method according to claim 11, wherein the transparent conductive film for the second thin film field effect transistor covers the via hole for the source electrode of the second thin film field effect transistor and the via hole for the power supply line.

15. The manufacturing method according to claim 11, wherein the method further comprises:

forming a counter substrate, which comprises: attaching a conductive shield element material to an inner surface of the counter substrate which is opposed to the array substrate so as to form a conductive shield element, one end of the conductive shield element being disposed on an upper plate of the sensing capacitor in the sensing unit, and the other end of the conductive shield element contacting the counter substrate; and bonding the counter substrate and the array substrate to each other and injecting liquid crystal material into a space formed between the counter substrate and the array substrate to form a liquid crystal layer.

16. The manufacturing method according to claim 15, wherein the conductive shield element is formed that, a size of the end of the conductive shield element disposed on the upper plate of the sensing capacitor is larger than or equal to a size of the upper plate of the sensing capacitor.

17. The manufacturing method according to claim 15, wherein the conductive shield element is formed by conductive polystyrene.

* * * * *